United States Patent
Su et al.

(10) Patent No.: US 11,338,563 B2
(45) Date of Patent: May 24, 2022

(54) MULTILAYER FILMS AND LAMINATES CONTAINING SLIP AGENTS

(71) Applicant: Dow Global Technologies LLC, Midland, MI (US)

(72) Inventors: Fengyi Su, Shanghai (CN); Andong Liu, Shanghai (CN); Hongyu Chen, Shanghai (CN); Jianping Pan, Beijing (CN); Xiao Bing Yun, Beijing (CN); Thomas Allgeuer, Horgen (CH); Erqiang Chen, Beijing (CN); Tipeng Zhao, Beijing (CN); Guihong Liao, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/620,170

(22) PCT Filed: Jun. 9, 2017

(86) PCT No.: PCT/CN2017/087642
§ 371 (c)(1),
(2) Date: Dec. 6, 2019

(87) PCT Pub. No.: WO2018/223358
PCT Pub. Date: Dec. 13, 2018

(65) Prior Publication Data
US 2021/0078315 A1 Mar. 18, 2021

(51) Int. Cl.
| | | |
|---|---|---|
| *B32B 27/32* | (2006.01) | |
| *B32B 7/12* | (2006.01) | |
| *B32B 27/08* | (2006.01) | |
| *B32B 27/16* | (2006.01) | |
| *B32B 27/36* | (2006.01) | |
| *C08K 5/092* | (2006.01) | |
| *C08K 5/20* | (2006.01) | |

(52) U.S. Cl.
CPC ............... *B32B 27/32* (2013.01); *B32B 7/12* (2013.01); *B32B 27/08* (2013.01); *B32B 27/16* (2013.01); *B32B 27/36* (2013.01); *C08K 5/092* (2013.01); *C08K 5/20* (2013.01); *B32B 2250/24* (2013.01); *B32B 2307/31* (2013.01); *B32B 2307/518* (2013.01); *B32B 2307/744* (2013.01); *B32B 2553/00* (2013.01)

(58) Field of Classification Search
None
See application file for complete search history.

(56) References Cited

U.S. PATENT DOCUMENTS

| | | | | |
|---|---|---|---|---|
| 3,207,736 A | * | 9/1965 | Wijga ..................... | C08L 23/02 524/295 |
| 3,713,965 A | * | 1/1973 | Widiger et al. ....... | B32B 27/304 428/518 |
| 4,218,510 A | * | 8/1980 | Willson ................. | B32B 27/36 428/349 |
| 5,677,383 A | | 10/1997 | Chum et al. | |
| 6,060,137 A | * | 5/2000 | Akao ...................... | B32B 27/08 428/35.2 |
| 6,111,023 A | | 8/2000 | Chum et al. | |
| 6,770,360 B2 | * | 8/2004 | Mientus .................. | G09F 3/10 428/354 |
| 6,984,695 B2 | | 1/2006 | Brown et al. | |
| 7,267,862 B1 | * | 9/2007 | Burke ..................... | B32B 15/08 428/212 |
| 2007/0020472 A1 | * | 1/2007 | Mills ...................... | B32B 27/32 428/515 |
| 2007/0275219 A1 | * | 11/2007 | Patel ..................... | C08F 210/16 428/219 |
| 2007/0298273 A1 | | 12/2007 | Thies et al. | |
| 2016/0152390 A1 | | 6/2016 | Itoh et al. | |
| 2016/0237318 A1 | * | 8/2016 | Turnage ................. | C09J 11/06 |
| 2017/0129228 A1 | | 5/2017 | Middlesworth et al. | |

FOREIGN PATENT DOCUMENTS

| | | | | |
|---|---|---|---|---|
| CN | 105694322 A | | 6/2016 | |
| JP | H06312491 | * | 11/1994 | ............. B32B 27/32 |
| JP | H06312491 A | | 11/1994 | |
| JP | 3160221 B2 | | 4/2001 | |
| JP | 2008221776 A | | 9/2008 | |
| JP | 2013117006 A | | 6/2013 | |
| WO | 98/05706 A1 | | 2/1998 | |
| WO | WO-9952972 A1 | * | 10/1999 | ............. B32B 27/32 |

OTHER PUBLICATIONS

Ogawa—JP H06-312491 A—ISR D#4—MT—3-layer PE film w—unsaturated fatty amide—1994 (Year: 1994).*
Erucamide _ C22H43NO—PubChem (Year: 2021).*
Oleamide _ C18H35NO—PubChem (Year: 2021).*
Docosanamide _ C22H45NO—PubChem (Year: 2021).*
Succinic acid (YMDB00338)—Yeast Metabolome Database (Year: 2021).*
Owens—Mechanism of corona induced self-adhesion of polyethylene film—J.Appl.Poly.Sci.—1975 (Year: 1975).*

* cited by examiner

*Primary Examiner* — Callie E Shosho
*Assistant Examiner* — John Vincent Lawler
(74) *Attorney, Agent, or Firm* — Quarles & Brady LLP

(57) ABSTRACT

Provided is a coextruded multilayer film. The coextruded multilayer film has at least two layers, including a sealant layer and a second layer in contact with the sealant layer. The sealant layer contains (A) a first ethylene-based polymer having a density from 0.865 g/cc to 0.930 g/cc and a melt index from 0.5 g/10 min to 25 g/10 min; (B) an unsaturated primary fatty acid amide having a melting point of 100° C. or less; and (C) a diprotic fatty acid having a melting point greater than 100° C. and a decomposition temperature greater than 200° C. The second layer contains a second ethylene-based polymer. Also provided is a laminate containing said sealant layer.

3 Claims, No Drawings

MULTILAYER FILMS AND LAMINATES CONTAINING SLIP AGENTS

BACKGROUND

The present disclosure relates to multilayer films and laminates having a sealant layer containing an ethylene-based composition including slip agents.

Film layers formed from ethylene-based polymers are used in multilayer films for a variety of applications, including, for example, food packaging and specialty packaging. An ethylene-based polymer outer film layer requires a low coefficient of friction (COF) (e.g., less than 0.30) for efficient processing of the films, such as in a fabrication line or a packaging line. To achieve a low COF, slip agents are typically added to the ethylene-based polymer outer layer, which may be a sealant layer. Conventional slip agents include unsaturated fatty acid amides such as erucamide and oleamide, which are known to lower a film's COF by migrating to the surface of the film. However, it is difficult to maintain a consistent low COF using conventional migratory slip agents under different environmental conditions, such as time, elevated temperature, elevated pressure, and various converting processes. Non-migratory slip agents such as silicones have also been added to the ethylene-based polymer outer layer, but they are known to be less effective at achieving a low COF (e.g., less than 0.30). Additionally, non-migratory slip agents are more expensive than migratory slip agents.

The art recognizes the need for a film that includes an ethylene-based polymeric layer that exhibits a low COF (e.g., less than 0.30) without a non-migratory slip agent. The art also recognizes the need for a laminate that includes an ethylene-based polymeric layer that exhibits a low COF (e.g., less than 0.30) without a non-migratory slip agent.

SUMMARY

The present disclosure provides a coextruded multilayer film. The coextruded multilayer film contains at least two layers including a sealant layer and a second layer in contact with the sealant layer. The sealant layer contains (A) a first ethylene-based polymer having a density from 0.865 g/cc to 0.930 g/cc and a melt index from 0.5 g/10 min to 25 g/10 min; (B) an unsaturated primary fatty acid amide having a melting point of 100° C. or less; and (C) a diprotic fatty acid having a melting point greater than 100° C. and a decomposition temperature greater than 200° C. The second layer contains a second ethylene-based polymer.

The present disclosure also provides a laminate. The laminate includes a first film and a second film, wherein the first film is laminated to the second film. The first film includes a sealant layer containing (A) a first ethylene-based polymer having a density from 0.865 g/cc to 0.930 g/cc and a melt index from 0.5 g/10 min to 25 g/10 min; (B) an unsaturated primary fatty acid amide having a melting point of 100° C. or less; and (C) a diprotic fatty acid having a melting point greater than 100° C. and a decomposition temperature greater than 200° C.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "alkyl" (or "alkyl moiety"), as described herein, refers to an organic radical derived from an aliphatic hydrocarbon by deleting one hydrogen atom therefrom. An alkyl moiety may be linear, branched, cyclic or a combination thereof.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations. In an embodiment, the ethylene-based polymer does not contain an aromatic comonomer polymerized therein.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

A "fatty acid" is a carboxylic acid having a hydrocarbon chain and a terminal carboxyl group. The fatty acid may contain more than one carboxyl group (e.g., a dicarboxyl fatty acid that contains two carboxyl groups).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$G_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from *Borealis*, Ineos, and Exxon Mobil.

A "hydrocarbon" is a compound that contains only hydrogen and carbon atoms. The hydrocarbon can be (i) branched or unbranched, (ii) saturated or unsaturated (iii) cyclic or acyclic, and (iv) any combination of (i)-(iii). Nonlimiting examples of hydrocarbons include alkanes, alkenes, and alkynes.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Low density polyethylene" (or "LDPE") consists of ethylene homopolymer, or ethylene/α-olefin copolymer comprising at least one $C_3$-$C_{10}$ α-olefin, preferably $C_3$-$C_4$ that has a density from 0.915 g/cc to 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from *Borealis*, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.910 g/cc, or 0.915 g/cc, or 0.920 g/cc, or 0.925 g/cc to 0.930 g/cc, or 0.935 g/cc, or 0.940 g/cc. Nonlimiting examples of LLDPE include TUFLINT™ linear low density polyethylene resins (available from The Dow Chemical Company), DOWLEX™ polyethylene resins (available from the Dow Chemical Company), and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include ELITE' enhanced polyethylene (available from The Dow Chemical Company), ELITE AT™ advanced technology resins (available from The Dow Chemical Company), SURPASS™ Polyethylene (PE) Resins (available from Nova Chemicals), and SMARTT™ (available from SK Chemicals Co.).

An "olefin-based polymer" or "polyolefin" is a polymer that contains more than 50 weight percent polymerized olefin monomer (based on total amount of polymerizable monomers), and optionally, may contain at least one comonomer. Nonlimiting examples of an olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. m-LLDPE has density from 0.913 g/cc, or 0.918 g/cc, or 0.920 g/cc to 0.925 g/cc, or 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Nonlimiting examples of ULDPE and VLDPE include ATTANE™ ULDPE resins (available form The Dow Chemical Company) and FLEXOMER™ VLDPE resins (available from The Dow Chemical Company).

Test Methods

Coefficient of Friction (COF) is measured according to ASTM D1894. The COF is measured as a film-to-film dynamic COF using a substrate film containing DOWLEX™ 2045G and 1000 ppm erucamide, fixed to a GM-1 COF Tester from Guangzhou Biaoji Packaging Instrument Co. Ltd. COF is measured at room temperature (25° C.) and 35% relative humidity. COF is measured in the machine direction at a sliding speed of 100 millimeters per minute. "Pre-Lamination COF" is measured on a film sample that is not laminated. "Laminate COF" is measured on a laminate structure after curing at 60° C. for 60 hours.

The "decomposition temperature" is the temperature at which the diprotic fatty acid chemically decomposes (i.e., one or more chemical bonds break). Decomposition temperature is measured by placing 20 mg of a sample in a platinum pan before being introduced into the carrousel of a TGA Q500 instrument. The sample is heated in a nitrogen/air atmosphere at a rate of 10° C./min from room temperature (25° C.) to 700° C. TA software reports the decomposition temperature.

Density is measured in accordance with ASTM D792, Method B. The result is recorded in grams per cubic centimeter (g/cc).

Melt index (MI) (I2) in g/10 min is measured using ASTM D-1238-04 (190° C./2.16 kg).

Differential Scanning Calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at 190° C.; the melted sample is then air-cooled to room temperature (25° C.). A 3-10 mg, 6 mm diameter specimen is extracted from the cooled polymer, weighed, placed in a light aluminum pan (50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −80° C. at a 10° C./minute cooling rate and held isothermal at −80° C. for 3 minutes. The sample is then heated to 180° C. (this is the "second heat" ramp) at a 10° C./minute heating rate. The cooling and second heating curves are recorded. The values determined are extrapolated onset of melting, Tm, and extrapolated onset of crystallization, Tc. Heat of fusion (Hf) (in Joules per gram), the calculated % crystallinity for polyethylene samples using the following equation: % Crystallinity =((Hf)/292 J/g)×100; and the calculated % crystallinity for polyethylene samples using the following equation: % Crystallinity=((Hf)/292 J/g)×100. The heat of fusion (Hf) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, The Basis of Thermal Analysis, in Thermal Characterization of Polymeric Materials 92, 277-278 (Edith A. Turi ed., 2d ed. 1997).

DETAILED DESCRIPTION

The present disclosure provides a coextruded multilayer film. The coextruded multilayer film has at least two layers, including a sealant layer and a second layer in contact with the sealant layer. The sealant layer contains (A) a first ethylene-based polymer having a density from 0.865 g/cc to 0.930 g/cc and a melt index from 0.5 g/10 min to 25 g/10 min; (B) an unsaturated primary fatty acid amide having a melting point of 100° C. or less; and (C) a diprotic fatty acid having a melting point greater than 100° C. and a decomposition temperature greater than 200° C. The second layer contains a second ethylene-based polymer.

The multilayer film contains two layers, or more than two layers. For example, the multilayer film can have two, three, four, five, six, seven, eight, nine, ten, eleven, or more layers. In an embodiment, the multilayer film contains only two layers, or only three layers.

1. Sealant Layer

The coextruded multilayer film contains a sealant layer. The sealant layer contains (A) a first ethylene-based polymer having a density from 0.865 g/cc to 0.930 g/cc and a melt index from 0.5 g/10 min to 25 g/10 min; (B) an unsaturated primary fatty acid amide having a melting point of 100° C. or less; (C) a diprotic fatty acid having a melting point greater than 100° C. and a decomposition temperature greater than 200° C.; (D), optionally, a saturated primary fatty acid amide having a melting point greater than 100° C.; and (E) optionally, an additive.

The sealant layer has two opposing surfaces. In an embodiment, the sealant layer is a continuous layer with two opposing surfaces.

A. First Ethylene-Based Polymer

The sealant layer contains a first ethylene-based polymer. The ethylene-based polymer has a density from 0.865 g/cc to 0.930 g/cc and a melt index from 0.5 g/10 min to 25 g/10 min. Nonlimiting examples of suitable ethylene-based polymer include LDPE and linear polyethylene. Nonlimiting examples of linear polyethylene include LLDPE, ULDPE, VLDPE, EPE, ethylene/α-olefin multi-block copolymers (also known as OBC), m-LLDPE, substantially linear, or linear, plastomers/elastomers, and combinations thereof. Nonlimiting examples of suitable ethylene-based polymer also include ethylene/α-olefin interpolymer and ethylene/α-olefin copolymer. Nonlimiting examples of suitable α-olefins include $C_3$-$C_{20}$ α-olefins, or $C_4$-$C_{20}$ α-olefins, or $C_3$-$C_{10}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene. In an embodiment, the ethylene-based polymer is an ethylene/1-octene interpolymer.

In an embodiment, the ethylene-based polymer contains greater than 50 wt % units derived from ethylene, or from 51 wt %, or 55 wt %, or 60 wt % to 70 wt %, or 80 wt %, or 90 wt %, or 95 wt %, or 99 wt %, or 100 wt % units derived from ethylene; and a reciprocal amount of units derived from an α-olefin comonomer, or from less than 50 wt %, or 49 wt %, or 45 wt %, or 40 wt % to 30 wt %, or 20 wt %, or 10 wt %, or 5 wt %, or 1 wt %, or 0 wt % units derived from an α-olefin comonomer, based on the weight of the ethylene-based polymer.

The ethylene-based polymer has a density from 0.865 g/cc, or 0.870 g/cc, or 0.875 g/cc, or 0.880 g/cc, or 0.885 g/cc, or 0.890 g/cc, or 0.895 g/cc, or 0.900 g/cc, or 0.910 g/cc, or 0.915 g/cc to 0.920 g/cc, or 0.925 g/cc, or 0.930 g/cc.

The ethylene-based polymer has a melt index from 0.5 g/10 min, or 1.0 g/10 min to 1.5 g/10 min, or 2.0 g/10 min, or 3.0 g/10 min, or 4.0 g/10 min, or 5.0 g/10 min, or 8.0 g/10 min, or 10 g/10 min, or 15 g/10 min, or 20 g/10 min, or 25 g/10 min.

In an embodiment, the ethylene-based polymer is a LLDPE. The LLDPE is an ethylene homopolymer or an ethylene/α-olefin copolymer consisting of units derived from ethylene and a $C_3$-$C_{10}$ α-olefin comonomer, or a $C_4$-$C_8$ α-olefin comonomer, or a $C_6$-$C_8$ α-olefin comonomer. In an embodiment, the LLDPE has density from 0.910 g/cc, or 0.915 g/cc, or 0.920 g/cc to 0.925 g/cc, or 0.930 g/cc; and a melt index from 0.5 g/10 min, or 1.0 g/10 min to 1.5 g/10 min, or 2.0 g/10 min, or 3.0 g/10 min, or 4.0 g/10 min, or 5.0 g/10 min, or 8.0 g/10 min, or 10 g/10 min, or 15 g/10 min, or 20 g/10 min, or 25 g/10 min. In an embodiment, the ethylene-based polymer is a LLDPE that is an ethylene/1-octene copolymer.

In an embodiment, the ethylene-based polymer is a LDPE. The LDPE is an ethylene homopolymer or an ethylene/α-olefin copolymer consisting of units derived from ethylene and a $C_3$-$C_{10}$ α-olefin comonomer, or a $C_4$-$C_8$ α-olefin comonomer, or a $C_6$-$C_8$ α-olefin comonomer. In an embodiment, the LDPE has density from 0.915 g/cc, 0.916 g/cc to 0.918 g/cc, or 0.920 g/cc, or 0.925 g/cc, or 0.930 g/cc; and a melt index from 0.5 g/10 min, or 1.0 g/10 min, or 1.5 g/10 min, or 2.0 g/10 min, or 3.0 g/10 min, or 4.0 g/10 min, or 5.0 g/10 min, or 8.0 g/10 min to 10 g/10 min, or 11 g/10 min, or 15 g/10 min, or 20 g/10 min, or 25 g/10 min.

The sealant layer may contain more than one ethylene-based polymer. In an embodiment, the sealant layer includes at least two ethylene-based polymers, wherein each ethylene-based polymer differs from one another compositionally, structurally, and/or physically. For example, the sealant layer may contain an LLDPE and a LDPE.

In an embodiment, the sealant layer contains from 70 wt %, or 75 wt %, or 80 wt %, or 85 wt %, or 90 wt % to 93 wt %, or 94 wt %, or 95 wt %, or 98 wt %, or 99 wt %, or 99.5 wt %, or 99.99 wt % ethylene-based polymer, based on the total weight of the sealant layer. In another embodiment, the sealant layer contains from 94 wt %, or 95 wt %, or 99 wt % to 99.99 wt % ethylene-based polymer, based on the total weight of the sealant layer.

In an embodiment, the ethylene-based polymer is selected from LLDPE, LDPE, and combinations thereof.

The ethylene-based polymer may comprise two or more embodiments disclosed herein.

B. Unsaturated Primary Fatty Acid Amide

The sealant layer contains an unsaturated primary fatty acid amide having a melting point of 100° C. or less. An "unsaturated primary fatty acid amide" is a molecule having the Structure (I):

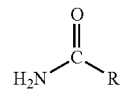

Structure (I)

wherein R is a $C_3$ to $C_{24}$ alkyl moiety that is mono-unsaturated or poly-unsaturated. In an embodiment, R is a $C_{11}$ to $C_{24}$, or a $C_{15}$ to $C_{23}$ alkyl moiety, or a $C_{17}$ to $C_{21}$ alkyl moiety that is mono-unsaturated or poly-unsaturated. A "mono-unsaturated" alky moiety is an alkyl that has one double bond (a C=C bond), with all of the remainder carbon atoms being linked via single bonds (C—C bonds). A "poly-unsaturated" alky moiety is an alkyl that has at least two double bonds (C=C bonds). In an embodiment, R is selected from a $C_{17}$ alkyl moiety and a $C_{21}$ alkyl moiety that is mono-unsaturated or poly-unsaturated. In an embodiment, R is mono-unsaturated. Nonlimiting examples of suitable unsaturated primary fatty acid amides include erucamide, oleamide, and combinations thereof.

In an embodiment, in the unsaturated primary fatty acid amide of the Structure (I), R is a $C_{21}$ alkyl moiety that is mono-unsaturated. In a further embodiment, the unsaturated primary fatty acid amide is erucamide. Erucamide has the following Structure (II):

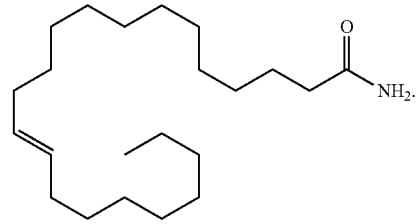

Structure (II)

In an embodiment, in the unsaturated primary fatty acid amide of the Structure (I), R is a $C_{17}$ alkyl moiety that is mono-unsaturated. In a further embodiment, the unsaturated primary fatty acid amide is oleamide. Oleamide has the following Structure (III):

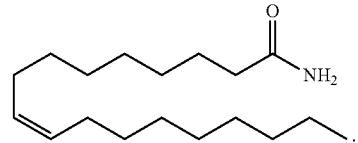

Structure (III)

The unsaturated primary fatty acid amide has a melting point of 100° C. or less. In an embodiment, the unsaturated primary fatty acid amide has a melting point from 40° C., or 50° C., or 60° C., or 65° C., or 70° C., or 75° C. to 80° C., or 85° C., or 90° C., or 95° C., or 100° C. In an embodiment, the unsaturated primary fatty acid amide is erucamide, which has a melting point of 75° C.-80° C. In another embodiment, the unsaturated primary fatty acid amide is oleamide, which has a melting point of 70° C.

The sealant layer may contain more than one unsaturated primary fatty acid amide. In an embodiment, the sealant layer includes at least two unsaturated primary fatty acid amides, wherein each unsaturated primary fatty acid amide differs from one another compositionally, structurally, and/or physically.

In an embodiment, the sealant layer contains from 0.00047 wt % (4.7 parts per million (ppm)), or 0.001 wt % (10 ppm), or 0.0095 wt % (95 ppm), or 0.01 wt % (100 ppm), or 0.05 wt % (500 ppm) to 0.08 wt % (800 ppm), or 0.10 wt % (1000 ppm), or 0.20 wt % (2000 ppm), or 0.24 wt % (2400 ppm), or 0.5 wt % (5000 ppm), or 1.0 wt % (10000 ppm), or 2.0 wt % (20000 ppm), or 3.0 wt % (30000 ppm), or 4.0 wt % (40000 ppm), or 4.5 wt % (45000 ppm), or 4.76 wt % (47600 ppm) unsaturated primary fatty acid amide, based on the total weight of the sealant layer.

The unsaturated primary fatty acid amide may comprise two or more embodiments disclosed herein.

C. Diprotic Fatty Acid

The sealant layer contains a diprotic fatty acid having a melting point greater than 100° C. and a decomposition temperature greater than 200° C. A "diprotic fatty acid" is a fatty acid having two ionizable hydrogen atoms per molecule. A nonlimiting example of a suitable diprotic fatty acid is a dicarboxyl fatty acid. In an embodiment, the diprotic fatty acid is a dicarboxyl fatty acid. Nonlimiting examples of suitable dicarboxyl fatty acids include succinic acid, hexanedioic acid, octanedioic acid, decanedioic acid, and dodecanedioic acid. In an embodiment, the diprotic fatty acid is selected from succinic acid ($C_4H_6O_4$), hexanedioic acid ($C_6H_{10}O_4$), octanedioic acid ($C_8H_{14}O_4$), decanedioic acid ($C_{10}H_{18}O_4$), dodecanedioic acid ($C_{12}H_{22}O_4$), and combinations thereof. In an embodiment, the diprotic fatty acid contains from 4 to 6, or 8, or 10, or 12, or 14, or 16, or 20 carbon atoms.

The diprotic fatty acid has a melting point greater than 100° C. In an embodiment, the diprotic fatty acid has a melting point from greater than 100° C. to 250° C., or from 101° C., or 105° C., or 110° C., or 120° C., or 130° C., or 140° C., or 150° C., or 160° C., or 170° C., or 180° C. to 185° C., or 190° C., or 200° C., or 210° C., or 220° C., or 230° C., or 240° C., or 250° C.

The diprotic fatty acid has a decomposition temperature greater than 200° C. In an embodiment, the diprotic fatty acid has a decomposition temperature from greater than 200° C. to 500° C., or from 201° C., or 205° C., or 210° C., or 220° C., or 225° C., or 230° C., or 235° C. to 240° C., or 245° C., or 250° C., or 270° C., or 300° C., or 310° C., or 320° C., or 330° C., or 340° C., or 350° C., or 380° C., or 400° C., or 450° C., or 500° C.

In an embodiment, the diprotic fatty acid is succinic acid, which has a melting point of 184° C. and a decomposition temperature of 235° C. Succinic acid has the following Structure (IV):

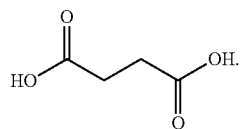

Structure (IV)

In an embodiment, the sealant layer contains from 0.00047 wt % (4.7 ppm), or 0.001 wt % (10 ppm), or 0.0095 wt % (95 ppm), or 0.01 wt % (100 ppm), or 0.02 wt % (200 ppm) to 0.05 wt % (500 ppm), or 0.10 wt % (1000 ppm), or 0.20 wt % (2000 ppm), or 0.24 wt % (2400 ppm), or 0.5 wt % (5000 ppm), or 1.0 wt % (10000 ppm), or 2.0 wt % (20000 ppm), or 3.0 wt % (30000 ppm), or 4.0 wt % (40000 ppm), or 4.5 wt % (45000 ppm), or 4.76 wt % (47600 ppm) diprotic fatty acid, based on the total weight of the sealant layer.

The sealant layer may contain more than one diprotic fatty acid. In an embodiment, the sealant layer includes at least two diprotic fatty acids, wherein each diprotic fatty acid differs from one another compositionally, structurally, and/or physically.

The diprotic fatty acid may comprise two or more embodiments disclosed herein.

D. Optional Saturated Primary Fatty Acid Amide

In an embodiment, the sealant layer contains a saturated primary fatty acid amide having a melting point greater than 100° C. A "saturated primary fatty acid amide" is a molecule having the Structure (V):

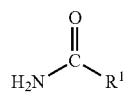

Structure (V)

wherein $R^1$ is a $C_3$ to $C_{27}$ alkyl moiety that is saturated. In an embodiment, $R^1$ is a $C_{11}$ to $C_{25}$, or a $C_{15}$ to $C_{23}$ alkyl moiety, or a $C_{15}$ to $C_{21}$ alkyl moiety that is saturated. A "saturated" alky moiety is an alkyl in which all carbon atoms are linked to one another via single bonds (C—C bonds). In other words, a saturated alkyl moiety excludes carbon atoms linked via double bonds (C═C bonds). In an embodiment, $R^1$ is selected from a $C_{17}$ alkyl moiety and a $C_{21}$ alkyl moiety that is saturated. Nonlimiting examples of suitable saturated primary fatty acid amides include behenamide, palmitamide, stearamide, and combinations thereof.

In an embodiment, in the saturated primary fatty acid amide of the Structure (IV), $R^1$ is a $C_{21}$ alkyl moiety that is saturated. In a further embodiment, the saturated primary fatty acid amide is behenamide. Behenamide has the following Structure (VI):

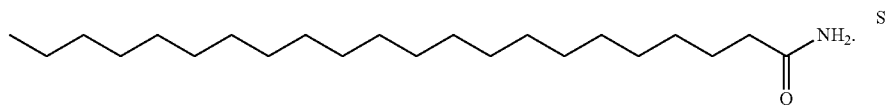

Structure (VI)

In an embodiment, in the saturated primary fatty acid amide of the Structure (V), $R^1$ is a $C_{15}$ alkyl moiety that is saturated. In a further embodiment, the saturated primary fatty acid amide is palmitamide.

In an embodiment, in the saturated primary fatty acid amide of the Structure (V), $R^1$ is a $C_{17}$ alkyl moiety that is saturated. In a further embodiment, the saturated primary fatty acid amide is stearamide.

The saturated primary fatty acid amide has a melting point greater than 100° C. In an embodiment, the saturated primary fatty acid amide has a melting point from greater than 100° C. to 150° C., or from 101° C., or 102° C., or 103° C., or 104° C., or 105° C., or 106° C. to 113° C., or 115° C., or 120° C., or 125° C., or 130° C., or 135° C., or 140° C., or 145° C., or 150° C. In an embodiment, the saturated primary fatty acid amide is behenamide, which has a melting point of 108° C.-113° C. In another embodiment, the saturated primary fatty acid amide is palmitamide, which has a melting point of 106° C.-107° C. In another embodiment, the saturated primary fatty acid amide is stearamide, which has a melting point of 109° C.

The sealant layer may contain more than one saturated primary fatty acid amide. In an embodiment, the sealant layer includes at least two saturated primary fatty acid amides, wherein each saturated primary fatty acid amide differs from one another compositionally, structurally, and/or physically.

In an embodiment, the sealant layer contains from 0.00047 wt % (4.7 ppm), or 0.001 wt % (10 ppm), or 0.0025 wt % (25 ppm), or 0.0083 wt % (83 ppm), or 0.01 wt % (100 ppm), or 0.06 wt % (600 ppm) to 0.12 wt % (1200 ppm), or 0.18 wt % (1800 ppm), or 1.0 wt % (10000 ppm), or 1.25 wt % (12500 ppm), or 2.0 wt % (20000 ppm), or 3.0 wt % (30000 ppm), or 4.0 wt % (40000 ppm), or 4.1 wt % (41000 ppm) saturated primary fatty acid amide, based on the total weight of the sealant layer.

The saturated primary fatty acid amide may comprise two or more embodiments disclosed herein.

E. Optional Additive(s)

In an embodiment, the sealant layer includes one or more optional additives.

Nonlimiting examples of suitable additives include antiblock agents, antioxidants, antistatic agents, stabilizing agents, nucleating agents, colorants, pigments, ultra violet (UV) absorbers or stabilizers, flame retardants, compatibilizers, plasticizers, fillers, processing aids, antifog additive, crosslinking agents (e.g., peroxides), and combinations thereof.

In an embodiment, the sealant layer includes an antiblock agent. An "antiblock agent" is a compound that minimizes, or prevents, blocking (i.e., adhesion) between two adjacent layers of film by creating a microscopic roughening of the film layer surface, which reduces the available contact area between adjacent layers. The antiblock agent may be organic or inorganic. Nonlimiting examples of suitable antiblock agents include silica, talc, calcium carbonate, and combinations thereof. In an embodiment, the antiblock agent is silica ($SiO_2$). The silica may be organic silica or synthetic silica. In an embodiment, the sealant layer contains from 0 wt %, or 0.10 wt % (1000 ppm), or 0.20 wt % (2000 ppm), or 0.25 wt % (2500 ppm) to 0.3 wt % (3000 ppm), or 0.4 wt % (4000 ppm), or 0.5 wt % (5000 ppm), or 1.0 wt % (10000 ppm), or 1.5 wt % (15000 ppm), or 2.0 wt % (20000 ppm) antiblock agent, based on the total weight of the sealant layer.

In an embodiment, the sealant layer contains from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the sealant layer.

The additive may comprise two or more embodiments disclosed herein.

In an embodiment, the sealant layer contains from 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.10 wt % to 0.15 wt %, or 0.20 wt %, or 0.25 wt %, or 0.30 wt %, or 0.35 wt %, or 0.40 wt %, or 0.45 wt %, or 0.50 wt %, or 0.80 wt %, or 1.0 wt %, or 1.5 wt %, or 2.0 wt %, or 2.5 wt %, or 3.0 wt %, or 3.5 wt %, or 4.0 wt %, or 4.5 wt %, or 5.0 wt % of a combined amount of the unsaturated primary fatty acid amide and the diprotic fatty acid, based on the total weight of the sealant layer.

In an embodiment, the unsaturated primary fatty acid amide and the diprotic fatty acid have a weight ratio of from 0.05:1, or 0.5:1, or 1:1, or 1.4:1 to 2.9:1, or 3:1, or 5:1, or 10:1, or 15:1, or 20:1.

In an embodiment, the unsaturated primary fatty acid amide and the diprotic fatty acid have a molar ratio of from 1:1 to 1:2.

In an embodiment, the sealant layer has a Pre-Lamination COF from 0.01, or 0.05, or 0.10 to 0.18, or 0.20, or 0.21, or 0.25, or 0.27, or 0.30.

In an embodiment, the sealant layer has a thickness from 5 μm, or 8 μm, or 10 μm, or 15 μm, or 20 μm, or 25 μm, or 30 μm, or 35 μm, or 40 μm, or 45 μm, or 50 μm to 55 μm, or 60 μm, or 65 μm, or 70 μm, or 75 μm, or 80 μm, or 90 μm, or 100 μm, or 120 μm, or 150 μm.

The sealant layer may comprise two or more embodiments disclosed herein.

2. Second Layer

The multilayer film includes a second layer. The second layer contains a second ethylene-based polymer.

The second layer has two opposing surfaces. In an embodiment, the second layer is a continuous layer with two opposing surfaces.

The second layer is in contact with the sealant layer. The second layer may be in direct contact or in indirect contact with the sealant layer. In an embodiment, the second layer directly contacts the sealant layer. The term "directly contacts," as used herein, is a layer configuration whereby the second layer is located immediately adjacent to the sealant layer and no intervening layers, or no intervening structures, are present between the sealant layer and the second layer.

In another embodiment, the second layer indirectly contacts the sealant layer. The term "indirectly contacts," as used herein, is a layer configuration whereby an intervening layer, or an intervening structure, is present between the sealant layer and the second layer.

The second ethylene-based polymer may be any ethylene-based polymer disclosed herein. The second ethylene-based polymer may be the same or different than the ethylene-based polymer of the sealant layer. In an embodiment, the second ethylene-based polymer is the same as the ethylene-based polymer of the sealant layer. In another embodiment, the second ethylene-based polymer is different than the ethylene-based polymer of the sealant layer.

In an embodiment, the second ethylene-based polymer is a LLDPE, a LDPE, or a combination thereof. In a further embodiment, the LLDPE is an ethylene/1-octene copolymer. In an embodiment, the second layer contains from 5 wt %, or 10 wt %, or 20 wt %, or 30 wt %, or 40 wt %, or 50 wt %, or 60 wt %, or 70 wt %, or 80 wt % to 90 wt %, or 95 wt %, or 99 wt % LLDPE; and a reciprocal amount of LDPE, or from 1 wt %, or 5 wt %, or 10 wt %, or 20 wt % to 30 wt %, or 40 wt %, or 50 wt %, or 60 wt %, or 70 wt %, or 80 wt %, or 90 wt %, or 95 wt % LDPE, based on the total weight of the second layer.

In an embodiment, the second layer contains one or more optional additives. The additive may be any additive disclosed herein. In an embodiment, the second layer contains from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the second layer.

In an embodiment, the second layer has a thickness from 5 μm, or 8 μm, or 10 μm, or 15 μm to 20 μm, or 25 μm, or 30 μm, or 35 μm, or 40 μm, or 45 μm, or 50 μm, or 55 μm, or 60 μm, or 65 μm, or 70 μm, or 75 μm, or 80 μm, or 85 μm, or 90 μm, or 100 μm, or 120 μm, or 150 μm.

The second layer may be a substrate layer or a core layer. In an embodiment, the second layer is a core layer. A "core layer" is a layer of a film structure that is an inner layer. In other words, neither surface of a core layer is an outermost surface of the film. In an embodiment, the second layer is a substrate layer. A "substrate layer" is a layer of a film structure that may be an inner layer or a skin layer. A "skin layer" is an outermost layer of a film structure. In other words, at least one surface of a skin layer is an outermost surface of the film.

The second layer may comprise two or more embodiments disclosed herein.

3. Optional Third Layer

In an embodiment, the multilayer film includes an optional third layer. The third layer contains a third ethylene-based polymer.

The third layer has two opposing surfaces. In an embodiment, the third layer is a continuous layer with two opposing surfaces.

The third layer is in contact with the second layer. The third layer may be in direct contact or in indirect contact with the second layer. In an embodiment, the third layer directly contacts the second layer. In another embodiment, the third layer indirectly contacts the second layer.

The third ethylene-based polymer may be any ethylene-based polymer disclosed herein. The third ethylene-based polymer may be the same or different than the first ethylene-based polymer of the sealant layer, and the third ethylene-based polymer may be the same or different than the second ethylene-based polymer of the second layer. In an embodiment, the third ethylene-based polymer is the same as the second ethylene-based polymer of the second layer. In another embodiment, the third ethylene-based polymer is different than the second ethylene-based polymer of the second layer.

In an embodiment, the third ethylene-based polymer is a LLDPE, a LDPE, or a combination thereof. In an embodiment, the third layer contains from 5 wt %, or 10 wt %, or 20 wt %, or 30 wt %, or 40 wt %, or 50 wt %, or 60 wt %, or 70 wt %, or 80 wt % to 90 wt %, or 99 wt % LLDPE; and a reciprocal amount of LDPE, or from 1 wt %, or 10 wt %, or 20 wt % to 30 wt %, or 40 wt %, or 50 wt %, or 60 wt %, or 70 wt %, or 80 wt %, or 90 wt %, or 95 wt % LDPE, based on the total weight of the third layer.

In an embodiment, the third layer contains one or more optional additives. The additive may be any additive disclosed herein. In an embodiment, the third layer contains from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the third layer.

In an embodiment, the third layer has a thickness from 5 µm, or 8 µm, or 10 µm, or 15 µm to 20 µm, or 25 µm, or 30 µm, or 35 µm, or 40 µm, or 45 µm, or 50 µm, or 55 µm, or 60 µm, or 65 µm, or 70 µm, or 75 µm, or 80 µm, or 85 µm, or 90 µm, or 100 µm, or 120 µm, or 150 µm.

The third layer may be a substrate layer or a core layer. In another embodiment, the third layer is a substrate layer.

The third layer may comprise two or more embodiments disclosed herein.

In an embodiment, the multilayer film has the following Structure (VII):

sealant layer/second layer     Structure (VII).

In an embodiment, the sealant layer and the third layer are skin layers on opposing sides of the second layer, which is a core layer. In a further embodiment, the sealant layer is in direct contact with the second layer, and the second layer is in direct contact with the third layer. In an embodiment, the multilayer film has the following Structure (VIII):

sealant layer/second layer/third layer     Structure (VIII).

In an embodiment, the multilayer film consists essentially of, or consists of, the sealant layer and the second layer. In another embodiment, the multilayer film consists essentially of, or consists of, the sealant layer, the second layer, and the third layer.

In an embodiment, the multilayer film has a thickness from 15 µm, or 20 µm, or 25 µm, or 30 µm, or 35 µm, or 40 µm, or 45 µm, or 50 µm, or 55 µm to 60 µm, or 65 µm, or 70 µm, or 75 µm, or 80 µm, or 85 µm, or 90 µm, or 95 µm, or 100 µm, or 150 µm, or 200 µm, or 250 µm, or 300 µm.

In an embodiment, the coextruded multilayer film contains, consists essentially of, or consists of:

(1) a sealant layer containing, consisting essentially of, or consisting of:

(A) from 70 wt %, or 75 wt %, 80 wt %, or 85 wt %, or 90 wt % to 93 wt %, or 94 wt %, or 95 wt %, or 98 wt %, or 99 wt %, or 99.5 wt %, or 99.99 wt % of the first ethylene-based polymer (such as
LLDPE and/or LDPE), based on the total weight of the sealant layer, the first ethylene-based polymer having
(i) a density from 0.865 g/cc to 0.930 g/cc, or from 0.900 g/cc, or 0.910 g/cc, or 0.915 g/cc to 0.920 g/cc, or 0.925 g/cc, or 0.930 g/cc; and
(ii) a melt index from 0.5 g/10 min to 25 g/10 min, or from 0.5 g/10 min, or 1.0 g/10 min to 1.5 g/10 min, or 2.0 g/10 min, or 3.0 g/10 min, or 4.0 g/10 min, or 5.0 g/10 min, or 8.0 g/10 min;

(B) from 0.00047 wt %, or 0.001 wt %, or 0.0095 wt %, or 0.01 wt %, or 0.05 wt % to 0.08 wt %, or 0.10 wt %, or 0.20 wt %, or 0.24 wt %, or 0.5 wt %, or 1.0 wt %, or 2.0 wt %, or 3.0 wt %, or 4.0 wt %, or 4.5 wt %, or 4.76 wt % unsaturated primary fatty acid amide (such as erucamide and/or oleamide), based on the total weight of the sealant layer, the unsaturated primary fatty acid amide having a melting point from 65° C., or 70° C., or 75° C. to 80° C., or 85° C., or 90° C., or 95° C.;

(C) from 0.00047 wt %, or 0.001 wt %, or 0.0095 wt %, or 0.01 wt %, or 0.02 wt % to 0.05 wt %, or 0.10 wt %, or 0.20 wt %, or 0.24 wt %, or 0.5 wt %, or 1.0 wt %, or 2.0 wt %, or 3.0 wt %, or 4.0 wt %, or 4.5 wt %, or 4.76 wt % diprotic fatty acid (such as succinic acid), based on the total weight of the sealant layer, the diprotic fatty acid having
(i) a melting point greater from 101° C., 110° C., or 130° C., or 150° C., or 170° C., or 180° C. to 185° C., or 190° C., or 200° C., or 210° C., or 220° C., or 230° C., or 240° C.; and (ii) a decomposition temperature from 220° C., or 225° C., or 230° C., or 235° C. to 240° C., or 245° C., or 250° C., or 270° C., or 300° C., or 310° C., or 320° C., or 330° C., or 340° C., or 350° C.;

(D) optionally, from 0.00047 wt %, or 0.001 wt %, or 0.0025 wt %, or 0.0083 wt %, or 0.01 wt %, or 0.06 wt % to 0.12 wt %, or 0.18 wt %, or 1.0 wt %, or 1.25 wt %, or 2.0 wt %, or 3.0 wt %, or 4.0 wt %, or 4.1 wt % saturated primary fatty acid amide (such as behenamide), based on the total weight of the sealant layer, the saturated primary fatty acid amide having a melting point from 101° C., or 103° C., or 106° C. to 113° C., or 115° C., or 120° C., or 125° C., or 130° C., or 135° C., or 140° C.;

(E) optionally, from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive (such as an antiblock agent), based on the total weight of the sealant layer;

(2) a second layer in contact with the sealant layer, the second layer containing a second ethylene-based polymer (such as LLDPE, LDPE, or a combination thereof); and (3) optionally, a third layer in contact with the second layer, the third layer containing a third ethylene-based polymer (such as LLDPE, LDPE, or a combination thereof); and the coextruded multilayer film has one, some, or all of the following properties:

(i) the sealant layer has a thickness from 5 μm, or 8 μm, or 10 μm, or 15 μm, or 20 μm, or 25 μm, or 30 μm, or 35 μm, or 40 μm, or 45 μm, or 50 μm to 55 μm, or 60 μm, or 65 μm, or 70 μm, or 75 μm, or 80 μm, or 85 μm, or 90 μm, or 100 μm, or 120 μm, or 150 μm; and/or (ii) the sealant layer contains from 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.10 wt % to 0.15 wt %, or 0.20 wt %, or 0.25 wt %, or 0.30 wt % of a combined amount of the unsaturated primary fatty acid amide and the diprotic fatty acid, based on the total weight of the sealant layer; and/or (iii) the sealant layer has a Pre-Lamination COF from 0.01, or 0.05, or 0.10 to 0.18, or 0.20, or 0.21, or 0.25, or 0.27, or 0.30; and/or (iv) the second layer has a thickness from 5 μm, or 8 μm, or 10 μm, or 15 μm to 20 μm, or 25 μm, or 30 μm, or 35 μm, or 40 μm, or 45 μm, or 50 μm, or 55 μm, or 60 μm, or 65 μm, or 70 μm, or 75 μm, or 80 μm, or 85 μm, or 90 μm, or 100 μm, or 120 μm, or 150 μm; and/or (v) the third layer has a thickness from 5 μm, or 8 μm, or 10 μm, or 15 μm to 20 μm, or 25 μm, or 30 μm, or 35 μm, or 40 μm, or 45 μm, or 50 μm, or 55 μm, or 60 μm, or 65 μm, or 70 μm, or 75 μm, or 80 μm, or 85 μm, or 90 μm, or 100 μm, or 120 μm, or 150 μm; and/or (vi) the coextruded multilayer film has a thickness of from 15 μm, or 20 μm, or 25 μm, or 30 μm, or 35 μm, or 40 μm, or 45 μm, or 50 μm, or 55 μm to 60 μm, or 65 μm, or 70 μm, or 75 μm, or 80 μm, or 85 μm, or 90 μm, or 95 μm, or 100 μm, or 150 μm, or 200 μm, or 250 μm, or 300 μm; and/or (vii) the unsaturated primary fatty acid amide and the diprotic fatty acid have a weight ratio of from 0.05:1, or 0.5:1, or 1:1, or 1.4:1 to 2.9:1, or 3:1, or 5:1, or 10:1, or 15:1, or 20:1; and/or (viii) the unsaturated primary fatty acid amide and the diprotic fatty acid have a molar ratio of from 1:1 to 1:2.

It is understood that the sum of the components in each of the layers disclosed herein, including the foregoing layers, yields 100 weight percent (wt %), based on the total weight of each respective layer.

In an embodiment, the coextruded multilayer film excludes non-migratory slip agents, such as silicone.

Some methods, for example, used to construct films are by cast coextrusion or blown coextrusion methods. Combinations of these methods are also possible. In an embodiment, the multilayer film is a coextruded blown film.

The coextruded multilayer film may or may not be oriented. In an embodiment, the coextruded multilayer film is not an oriented film. In a further embodiment, the coextruded multilayer film is not biaxially oriented. In other words, the coextruded multilayer film is not stretched after extrusion. In another embodiment, the coextruded multilayer film is oriented (e.g., biaxially oriented).

In an embodiment, the coextruded multilayer film is included in a laminate. In such embodiments, an outermost surface of the sealant layer is an outermost surface of the laminate.

The coextruded multilayer film may comprise two or more embodiments disclosed herein.

Laminate

The present disclosure provides a laminate. In an embodiment, the laminate includes a first film containing a sealant layer and a second film, wherein the first film is laminated to the second film. The sealant layer contains (A) a first ethylene-based polymer having a density from 0.865 g/cc to 0.930 g/cc and a melt index from 0.5 g/10 min to 25 g/10 min; (B) an unsaturated primary fatty acid amide having a melting point of 100° C. or less; and (C) a diprotic fatty acid having a melting point greater than 100° C. and a decomposition temperature greater than 200° C.

The laminate contains at least two films, or more than two films. For example, the laminate can have two, three, four, five, six, seven, eight, nine, ten, eleven, or more films. In an embodiment, the laminate contains only two films, or only three films.

In an embodiment, the laminate has the following Structure (IX):

first film/second film             Structure (IX).

In an embodiment, the laminate includes a first film, an adhesive layer in contact with the first film, and a second film in contact with the adhesive layer. In an embodiment, the laminate has the following Structure (X):

first film/adhesive layer/second film             Structure (X)

In an embodiment, the first film is a monolayer film containing a sealant layer and the second film is a monolayer film containing a substrate layer, and the laminate has the following Structure (XI):

sealant layer/adhesive layer/substrate layer             Structure (XI).

In an embodiment, the laminate includes an optional third film laminated to the second film. In a further embodiment, the laminate includes an optional second adhesive layer in contact with the second film, and an optional third film in contact with the second adhesive layer. In an embodiment, the laminate has the following Structure (XII):

first film/adhesive layer/second film/second adhesive layer/third film             Structure (XII).

1. First Film

The laminate includes a first film. The first film includes a sealant layer.

The first film has two opposing surfaces. The first film may be a monolayer film or a multilayer film. In an embodiment, the first film is a multilayer film containing at least two layers, or more than two layers. For example, the first film can have two, three, four, five, six, seven, eight, nine, ten, or more layers. In an embodiment, the first film contains only one layer, or only three layers.

In an embodiment, the first film is a multilayer film including an optional core layer in contact with the sealant layer and an optional third substrate layer in contact with the core layer. In an embodiment, the outermost surface of the third substrate is laminated to an outermost surface of the second film.

A. Sealant Layer

The first film contains a sealant layer. The sealant layer may be any sealant layer disclosed herein. In an embodiment, the sealant layer is a skin layer. In other words, an outermost surface of the sealant layer is an outermost surface of the first film, and further an outermost surface of the laminate.

B. Optional Core Layer and Optional Third Substrate Layer

In an embodiment, the first film is a multilayer film that includes a core layer and a third substrate layer.

The core layer has two opposing surfaces. In an embodiment, the core layer is a continuous layer with two opposing surfaces. The core layer is in contact with the sealant layer. The core layer may be in direct contact or in indirect contact with the sealant layer. In an embodiment, the core layer directly contacts the sealant layer. In another embodiment, the core layer indirectly contacts the sealant layer.

In an embodiment, the core layer contains a third ethylene-based polymer. The third ethylene-based polymer may be any ethylene-based polymer disclosed herein. The third ethylene-based polymer may be the same or different than the ethylene-based polymer of the sealant layer. In an embodiment, the third ethylene-based polymer is a LLDPE, a LDPE, or a combination thereof. In an embodiment, the core layer contains from 5 wt %, or 10 wt %, or 20 wt %, or 30 wt %, or 40 wt %, or 50 wt %, or 60 wt %, or 70 wt %, or 80 wt % to 90 wt %, or 95 wt %, or 99 wt % LLDPE; and a reciprocal amount of LDPE, or from 1 wt %, or 5 wt %, or 10 wt %, or 20 wt % to 30 wt %, or 40 wt %, or 50 wt %, or 60 wt %, or 70 wt %, or 80 wt %, or 90 wt %, or 95 wt % LDPE, based on the total weight of the core layer.

In an embodiment, the core layer contains one or more optional additives. The additive may be any additive disclosed herein. In an embodiment, the core layer contains from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the core layer. In an embodiment, the core layer contains an additive that is a slip agent selected from an unsaturated primary fatty acid amide having a melting point of 100° C. or less; a saturated primary fatty acid amide having a melting point greater than 100° C.; a diprotic fatty acid having a melting point greater than 100° C. and a decomposition temperature greater than 200° C.; and combinations thereof.

In an embodiment, the core layer has a thickness from 5 µm, or 8 µm, or 10 µm, or 15 µm to 20 µm, or 25 µm, or 30 µm, or 35 µm, or 40 µm, or 45 µm, or 50 µm, or 55 µm, or 60 µm, or 65 µm, or 70 µm, or 75 µm, or 80 µm, or 85 µm, or 90 µm, or 100 µm, or 120 µm, or 150 µm.

The third substrate layer has two opposing surfaces. In an embodiment, the third substrate layer is a continuous layer with two opposing surfaces. The third substrate layer is in contact with the core layer and the second film. The third substrate layer may be in direct contact or in indirect contact with the core layer. In an embodiment, the third substrate layer directly contacts the core layer. In another embodiment, the third substrate layer indirectly contacts the core layer. The third substrate layer may be in direct contact or in indirect contact with the second film. In an embodiment, the third substrate layer directly contacts the second film. In another embodiment, the third substrate layer indirectly contacts the second film.

In an embodiment, the third substrate layer contains a fourth ethylene-based polymer. The fourth ethylene-based polymer may be any ethylene-based polymer disclosed herein. The fourth ethylene-based polymer may be the same or different than the ethylene-based polymer of the sealant layer, and the fourth ethylene-based polymer may be the same or different than the third ethylene-based polymer of the core layer. In an embodiment, the fourth ethylene-based polymer is a LLDPE, a LDPE, or a combination thereof. In an embodiment, the third substrate layer contains from 5 wt %, or 10 wt %, or 20 wt %, or 30 wt %, or 40 wt %, or 50 wt %, or 60 wt %, or 70 wt %, or 80 wt % to 90 wt %, or 95 wt %, or 99 wt % LLDPE; and a reciprocal amount of LDPE, or from 1 wt %, or 5 wt %, or 10 wt %, or 20 wt % to 30 wt %, or 40 wt %, or 50 wt %, or 60 wt %, or 70 wt %, or 80 wt %, or 90 wt %, or 95 wt % LDPE, based on the total weight of the third substrate layer.

In an embodiment, the third substrate layer contains one or more optional additives. The additive may be any additive disclosed herein. In an embodiment, the core layer contains from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the third substrate layer.

In an embodiment, the third substrate layer has a thickness from 5 µm, or 8 µm, or 10 µm, or 15 µm to 20 µm, or 25 µm, or 30 µm, or 35 µm, or 40 µm, or 45 µm, or 50 µm, or 55 µm, or 60 µm, or 65 µm, or 70 µm, or 75 µm, or 80 µm, or 85 µm, or 90 µm, or 100 µm, or 120 µm, or 150 µm.

In an embodiment, the third substrate layer is corona treated.

The core layer and the third substrate layer may comprise two or more embodiments disclosed herein.

The first film may comprise two or more embodiments disclosed herein.

2. Second Film

The laminate includes a second film. The first film is laminated to the second film.

The second film has two opposing surfaces. The second film may be a monolayer film or a multilayer film. In an embodiment, the second film is a monolayer film. In another embodiment, the second film is a multilayer film containing at least two layers, or more than two layers. For example, the second film can have two, three, four, five, six, seven, eight, nine, ten, or more layers. In an embodiment, the second film contains only one layer, or only two layers, or only three layers.

In an embodiment, the second film includes a substrate layer. The substrate layer has two opposing surfaces. In an embodiment, the substrate layer is a continuous layer with two opposing surfaces.

The substrate layer is in contact with the first film. The substrate layer may be in direct contact or in indirect contact with the first film. In an embodiment, the substrate layer directly contacts the first film. In another embodiment, the substrate layer indirectly contacts the first film.

In an embodiment, the substrate layer is in contact with an optional adhesive layer. The substrate layer may be in direct contact or in indirect contact with the adhesive layer. In an embodiment, the substrate layer directly contacts the adhesive layer. In another embodiment, the substrate layer indirectly contacts the adhesive layer.

In an embodiment, the substrate layer contains a component selected from a second ethylene-based polymer, propylene-based polymer, polyamide (such as nylon), polyester, ethylene vinyl alcohol copolymer, polyethylene terephthalate (PET), ethylene vinyl acrylate copolymer, ethylene methyl acrylate copolymer, ethylene ethyl acrylate copolymer, ethylene butyl acrylate copolymer, ethylene acrylic acid copolymer, ethylene methacrylic acid copolymer, an ionomer of ethylene acrylic acid, an ionomer of methacylic acid, maleic anhydride grafted ethylene-based polymer, a polystyrene, a metal foil, and combinations thereof. In an embodiment, the substrate layer contains PET. In another embodiment, the substrate layer contains a second ethylene-based polymer. The second ethylene-based polymer may be any ethylene-based polymer disclosed herein. The second ethylene-based polymer may be the same or different than the ethylene-based polymer of the sealant layer.

In an embodiment, the second film, or further the substrate layer, has a thickness from 5 μm, or 8 μm, or 10 μm, or 12 μm, or 15 μm to 20 μm, or 25 μm, or 30 μm, or 35 μm, or 40 μm, or 45 μm, or 50 μm, or 55 μm, or 60 μm, or 65 μm, or 70 μm, or 75 μm, or 80 μm, or 85 μm, or 90 μm, or 100 μm, or 150 μm.

The substrate layer may comprise two or more embodiments disclosed herein.

The second film may comprise two or more embodiments disclosed herein.

3. Optional Adhesive Layer

In an embodiment, the laminate includes an adhesive layer. The adhesive layer is in contact with the first film and the second film.

The adhesive layer has two opposing surfaces. In an embodiment, the adhesive layer is a continuous layer with two opposing surfaces. The adhesive layer is in contact with the first film. The adhesive layer may be in direct contact or in indirect contact with the first film. In an embodiment, the adhesive layer directly contacts the first film. In another embodiment, the adhesive layer indirectly contacts the first film.

The adhesive layer contains an adhesive. Nonlimiting examples of suitable adhesives include polyurethane adhesives, polyacrylate adhesives, and combinations thereof. A nonlimiting example of a suitable polyurethane adhesive is MOR-FREE™ 706A/C-79, a solvent-less polyurethane adhesive available from Rohm and Haas. A nonlimiting example of a suitable polyacrylate adhesive is ROBOND™ L-168/CR3A, a water-based polyacrylate adhesive available from The Dow Chemical Company.

In an embodiment, the adhesive layer has a dry coating weight of from 0.5 grams per square meter (g/m$^2$), or 1.0 g/m$^2$, or 1.5 g/m$^2$, or 1.8 g/m$^2$, or 1.9 g/m$^2$ to 2.0 g/m$^2$, or 2.5 g/m$^2$, or 3.0 g/m$^2$.

The adhesive layer may comprise two or more embodiments disclosed herein.

4. Optional Third Film

In an embodiment, the laminate includes a third film. The third film is laminated to the second film.

The third film has two opposing surfaces. The third film may be a monolayer film or a multilayer film. In an embodiment, the third film is a monolayer film. In another embodiment, the third film is a multilayer film containing at least two layers, or more than two layers. For example, the third film can have two, three, four, five, six, seven, eight, nine, ten, or more layers. In an embodiment, the third film contains only one layer, or only two layers, or only three layers.

In an embodiment, the third film includes a second substrate layer. The second substrate layer may be any substrate layer disclosed herein.

The second substrate layer is in contact with the second film. The second substrate layer may be in direct contact or in indirect contact with the second film. In an embodiment, the second substrate layer directly contacts the second film. In another embodiment, the second substrate layer indirectly contacts the second film.

The second substrate layer may comprise two or more embodiments disclosed herein.

The third film may comprise two or more embodiments disclosed herein

5. Optional Second Adhesive Layer

In an embodiment, the laminate includes a second adhesive layer. The second adhesive layer is in contact with the second film. The second adhesive layer may be any adhesive layer disclosed herein.

The second adhesive layer has two opposing surfaces. In an embodiment, the second adhesive layer is a continuous layer with two opposing surfaces. The second adhesive layer is in contact with the second film. The second adhesive layer may be in direct contact or in indirect contact with the second film. In an embodiment, the second adhesive layer directly contacts the second film. In another embodiment, the second adhesive layer indirectly contacts the second film.

In an embodiment, the second adhesive layer is in contact with the optional third film. The second adhesive layer may be in direct contact or in indirect contact with the third film. In an embodiment, the second adhesive layer directly contacts the third film. In another embodiment, the second adhesive layer indirectly contacts the third film.

The second adhesive layer may comprise two or more embodiments disclosed herein

In an embodiment, the first film is a multilayer film with a sealant layer, a core layer, and a third substrate layer; and the second film is a monolayer film containing a substrate layer; and the laminate has the following Structure (XIII):

sealant layer/core layer/third substrate layer/adhesive layer/substrate layer    Structure (XIII).

In an embodiment, the first film is a multilayer film with a sealant layer, a core layer, and a third substrate layer; and the second film is a monolayer film containing a substrate layer; the third film is a monolayer film containing a second substrate layer; and the laminate has the following Structure (XIV): sealant layer/core layer/third substrate layer/adhesive layer/substrate layer/second adhesive layer/second substrate layer    Structure (XIV).

In an embodiment, the sealant layer of the laminate has a Pre-Lamination COF from 0.01, or 0.05, or 0.10 to 0.18, or 0.20, or 0.21, or 0.25, or 0.27, or 0.30.

In an embodiment, the sealant layer of the laminate has a COF of from 0.01, or 0.05, or 0.10 to 0.18, or 0.20, or 0.21, or 0.25, or 0.27, or 0.30 after curing at 60° C. for 60 hours (hereinafter, the "Laminate COF"). In an embodiment, the sealant layer of the laminate has a change in COF after 60° C. cure of less than 0.20, or less than 0.15, or less than 0.10. In another embodiment, the sealant layer of the laminate has a change in COF from −0.20, or −0.10, or −0.05, or −0.02, or 0 to 0.01, or 0.05, or 0.10, or 0.15, or less than 20. The change in COF is calculated in accordance with the following Equation (I):

COF Change=Laminate COF−Pre-Lamination COF    Equation (I).

In an embodiment, the laminate contains, consists essentially of, or consists of:
(1) a first film containing
  (A) a sealant layer containing, consisting essentially of, or consisting of:
    (i) from 70 wt %, or 75 wt %, or 80 wt %, or 85 wt %, or 90 wt % to 93 wt %, or 94 wt %, or 95 wt %, or 98 wt %, or 99 wt %, or 99.5 wt %, or 99.99 wt % of a first ethylene-based polymer (such as LLDPE and/or LDPE), based on the total weight of the sealant layer, the ethylene-based polymer having (a) a density from 0.865 g/cc to 0.930 g/cc, or from 0.900 g/cc, or 0.910 g/cc, or 0.915 g/cc to 0.920 g/cc, or 0.925 g/cc, or 0.930 g/cc; and (b) a melt index from 0.5 g/10 min to 25 g/10 min, or from 0.5 g/10 min, or 1.0 g/10 min to 1.5 g/10 min, or 2.0 g/10 min, or 3.0 g/10 min, or 4.0 g/10 min, or 5.0 g/10 min, or 8.0 g/10 min;

(ii) from 0.00047 wt %, or 0.001 wt %, or 0.0095 wt %, or 0.01 wt %, or 0.05 wt % to 0.08 wt %, or 0.10 wt %, or 0.20 wt % unsaturated primary fatty acid amide (such as erucamide and/or oleamide), based on the total weight of the sealant layer, the unsaturated primary fatty acid amide having a melting point from 65° C., or 70° C., or 75° C. to 80° C., or 85° C., or 90° C.;

(iii) from 0.00047 wt %, or 0.001 wt %, or 0.0095 wt %, or 0.01 wt %, or 0.02 wt % to 0.05 wt %, or 0.10 wt %, or 0.20 wt % diprotic fatty acid (such as succinic acid), based on the total weight of the sealant layer, the diprotic fatty acid having (a) a melting point from 101° C., 110° C., or 130° C., or 150° C., or 170° C., or 180° C. to 185° C., or 190° C., or 200° C., or 210° C., or 220° C., or 230° C., or 240° C.; and (b) a decomposition temperature from 220° C., or 225° C., or 230° C., or 235° C. to 240° C., or 245° C., or 250° C., or 270° C., or 300° C., or 310° C., or 320° C., or 330° C., or 340° C., or 350° C.;

(iv) optionally, from 0.00047 wt %, or 0.001 wt %, or 0.0025 wt %, or 0.0083 wt %, or 0.01 wt %, or 0.06 wt % to 0.12 wt %, or 0.18 wt %, or 1.0 wt %, or 1.25 wt %, or 2.0 wt % saturated primary fatty acid amide (such as behenamide), based on the total weight of the sealant layer, the saturated primary fatty acid amide having a melting point from 101° C., or 103° C., or 106° C. to 113° C., or 115° C., or 120° C., or 125° C., or 130° C., or 135° C., or 140° C.;

(v) optionally, from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive (such as an antiblock agent), based on the total weight of the sealant layer;

(B) optionally, a core layer in contact with the sealant layer, the core layer containing a third ethylene-based polymer (such as LLDPE and/or LDPE);

(C) optionally, a third substrate layer in contact with the core layer, the third substrate layer containing a fourth ethylene-based polymer (such as LLDPE and/or LDPE);

(2) optionally, an adhesive layer in contact with the first film;

(3) a second film containing a substrate layer in contact with the adhesive layer, the substrate layer containing a component selected from a second ethylene-based polymer, a propylene-based polymer, a polyamide (such as nylon), a polyester, PET, a metal foil, and combinations thereof; wherein the first film is laminated to the second film; and the laminate has one, some, or all of the following properties:

(i) the sealant layer contains from 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.10 wt % to 0.15 wt %, or 0.20 wt %, or 0.25 wt %, or 0.30 wt % of a combined amount of the unsaturated primary fatty acid amide and the diprotic fatty acid, based on the total weight of the sealant layer; and/or (ii) the sealant layer has a Pre-Lamination COF from 0.01, or 0.05, or 0.10 to 0.18, or 0.20, or 0.21, or 0.25, or 0.27, or 0.30; and/or (iii) the sealant layer has a Laminate COF of from 0.01, or 0.05, or 0.10 to 0.18, or 0.20, or 0.21, or 0.25, or 0.27, or 0.30; and/or (iv) the sealant layer of the laminate has a change in COF of from −0.20, or −0.10, or −0.05, or −0.02, or 0 to 0.01, or 0.05, or 0.10, or 0.15, or less than 20; and/or (v) the laminate has a thickness of from 15 µm, or 20 µm, or 25 µm, or 30 µm, or 35 µm, or 40 µm, or 45 µm, or 50 µm, or 55 µm to 60 µm, or 65 µm, or 70 µm, or 75 µm, or 80 µm, or 85 µm, or 90 µm, or 95 µm, or 100 µm, or 150 µm, or 200 µm, or 250 µm, or 300 µm; and/or (vi) the unsaturated primary fatty acid amide and the diprotic fatty acid have a weight ratio of from 0.05:1, or 0.5:1, or 1:1, or 1.4:1 to 2.9:1, or 3:1, or 5:1, or 10:1, or 15:1, or 20:1; and/or (vii) the unsaturated primary fatty acid amide and the diprotic fatty acid have a molar ratio of from 1:1 to 1:2.

In an embodiment, the laminate excludes non-migratory slip agents, such as silicone.

The first film, the second film, and the optional third film of the laminate may be a coextruded multilayer structure.

Some methods, for example, used to construct laminates are by adhesive lamination, extrusion lamination, thermal lamination, dry lamination, and solvent-less lamination. Combinations of these methods are also possible.

The first film, the second film, and the optional third film of the laminate may or may not be oriented. In an embodiment, one or more, or each of the first film, the second film, and the optional third film is not an oriented film. In a further embodiment, one or more, or each of first film, the second film, and the optional third film is not biaxially oriented. In another embodiment, one or more, or each of first film, the second film, and the optional third film is oriented (e.g., biaxially oriented).

The laminate may comprise two or more embodiments disclosed herein.

The present disclosure also provides an article containing the coextruded multilayer film and/or the laminate, such as a package. Nonlimiting examples of suitable packages include food packages, specialty packages, and detergent packages (liquid and powder). In an embodiment, a package is provided, the package formed from two opposing laminates. In an embodiment, the sealant layer of the first laminate is in contact with the sealant layer of the second laminate. In a further embodiment, a heat seal is formed from the opposing sealant layers to produce a package.

By way of example, and not limitation, some embodiments of the present disclosure will now be described in detail in the following Examples.

EXAMPLES

Materials used in the examples are provided in Table 1 below.

TABLE 1

| Material/Description | Properties | Source |
| --- | --- | --- |
| DOWLEX ™ 2045G (ethylene/1-octene copolymer)(LLDPE) | MI (I2)(190° C./2.16 kg) = 1.0 g/10 min, Density = 0.920 g/cc, Melting point = 119° C. | The Dow Chemical Company |
| Erucamide (unsaturated primary fatty acid amide) | 95% purity Melting point = 79° C. | J&K Scientific Ltd. |
| Succinic Acid (diprotic fatty acid) | 95% purity Melting point = 185° C. Decomposition Temperature = 235° C. | Meryer (Shanghai Mai Ruier Chemical Technology Co., Ltd. |

Monolayer Blown Film: A slip agent blend is prepared by blending the erucamide and succinic acid at a specific molar ratio. Then, the slip agent blend and DOWLEX™ 2045G are added to a Haake™ blown line extruder, and mixed at 190° C. for 10 minutes. Monolayer blown film samples are fabricated on the Haake™ blown line (die gap=1 mm; temperature profile=180-210° C.; length/diameter (L/D) ratio=25; output=5 kg/hour). The resulting monolayer blown film samples have a thickness of 50 µm. Two weeks after the monolayer blown film samples are formed, the monolayer blown film samples are tested for Pre-Lamination COF. Five specimens of each monolayer blown film are tested, and the average Pre-Lamination COF is reported. The results are reported in Table 2.

Laminate

The monolayer blown film samples prepared above undergo corona treatment (150 Volts) using a CTP 2000KA from Nanjing Suman Electronics Co. Ltd.

A PET substrate layer with a thickness of 12 µm is provided. The PET substrate layer has two opposing surfaces. One surface of the PET substrate layer is coated with ROBOND™ L-168/CR3A (a water-based polyacrylate adhesive from The Dow Chemical Company) using an Automatic Coating Machine KY-1000 from Beijing Jingjing Technology Co. Ltd. (with an RDS coating rod to control thickness and a coating speed of 100 mm/min). The coated PET substrate layer is placed in an oven at 80° C. for 40 seconds to dry the solvent of the ROBOND™ L-168/CR3A adhesive, forming an adhesive layer having a dry weight of 2 g/m². The PET substrate layer and adhesive layer have the following Structure (A):

PET substrate layer/adhesive layer    Structure (A).

The corona-treated monolayer blown film samples are laminated with Structure (A) via hot roller at 80° C. using a Beijing Century Jintu SCI-TECH Co., Ltd. multi-function laminator (model HR-380). Then, the samples are placed in an oven at 60° C. for 60 hours for aging. The layer formed by the corona-treated monolayer blown film samples is a sealant layer. The resulting laminates have the following Structure (B):

PET substrate layer/adhesive layer/sealant layer    Structure (B).

The PET substrate layer is an outer layer that is in direct contact with the adhesive layer, and the adhesive layer is in direct contact with the sealant layer. The resulting laminates have a thickness of 80 µm. The layer configurations are provided below in Table 2.

One week after aging, the laminate samples are tested for Laminate COF. Five specimens of each laminate are tested, and the average Laminate COF is reported. The results are reported in Table 2. In Table 2, "CS" refers to Comparative Sample.

Comparative Sample 4 is a corona-treated monolayer blown film (i.e., CS 4 is not laminated). Laminate COF is not measured for Comparative Sample 4 because it is not a laminate structure.

TABLE 2

|  | Ex. 1[6] | Ex. 2[6] | CS 3[6] | CS 4[7] |
| --- | --- | --- | --- | --- |
| Sealant Layer Composition[1] | | | | |
| DOWLEX ™ 2045G (wt %)[2] | 99.9 | 99.9 | 99.9 | 100 |
| Erucamide (wt %)[2] | 0.074 | 0.059 | 0.1 | — |
| Succinic Acid (wt %)[2] | 0.026 | 0.041 | — | — |
| Total wt %[2] | 100 | 100 | 100 | 100 |
| Properties: | | | | |
| Sealant Layer Molar Ratio of Erucamide:Succinic Acid | 1:1 | 1:2 | N/A | N/A |
| Sealant Layer Weight Ratio of Erucamide:Succinic Acid | 2.86:1 | 1.43:1 | N/A | N/A |

TABLE 2-continued

|  | Ex. 1[6] | Ex. 2[6] | CS 3[6] | CS 4[7] |
|---|---|---|---|---|
| Pre-Lamination COF[3] | 0.20 ± 0.02 | 0.16 ± 0.02 | 0.15 ± 0.02 | 0.32 ± 0.05 |
| Laminate COF[4] | 0.18 ± 0.03 | 0.17 ± 0.03 | 0.35 ± 0.03 | N/A |
| COF Change[5] | −0.02 | 0.01 | 0.20 | N/A |

[1]The sealant layer is formed from the monolayer blown film described above.
[2]Based on the total weight of the sealant layer.
[3]Pre-Lamination COF is measured two weeks after the monolayer blown film samples are formed, before the monolayer blown film samples are laminated.
[4]Laminate COF is measured after a laminate is formed, and one week after samples are aged in an oven at 60° C. for 60 hours.
[5]COF Change is calculated in accordance with the following equation: COF Change = Laminate COF − Pre-Lamination COF.
[6]Ex. 1, Ex. 2 and CS 3 are laminate structures having Structure B (PET substrate layer/adhesive layer/sealant layer).
[7]CS 4 is a corona-treated monolayer blown film that is a sealant layer.

As shown, a comparative laminate with an adhesive layer, a PET substrate layer, and a sealant layer containing (A) an ethylene-based polymer (DOWLEX™ 2045G and LDPE) and (B) an unsaturated primary fatty acid amide having a melting point of 100° C. or less (erucamide) (CS 3)—and no (C) diprotic fatty acid having a melting point greater than 100° C. and a decomposition temperature greater than 200° C.—exhibits a high Laminate COF of 0.35, and a high COF Change of 0.20.

Applicant surprisingly found that a laminate with an adhesive layer, a PET substrate layer, and a sealant layer containing (A) an ethylene-based polymer (DOWLEX™ 2045G and LDPE); (B) an unsaturated primary fatty acid amide having a melting point of 100° C. or less (erucamide); and (C) diprotic fatty acid having a melting point greater than 100° C. and a decomposition temperature greater than 200° C. (succinic acid) (Ex. 1-2) advantageously exhibits a Pre-Lamination COF of less than 0.30, a Laminate COF of less than 0.30, and a COF Change of 0.01 or less.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A laminate comprising:
a first film that is a corona-treated monolayer blown film and is a sealant layer comprising
(A) an ethylene/octene copolymer having a density from 0.910 g/cc to 0.930 g/cc and a melt index from 0.5 g/10 min to 25 g/10 min;
(B) from 590 ppm to 740 ppm of erucamide;
(C) from 260 ppm to 410 ppm of succinic acid;
(D) an erucamide to succinic acid weight ratio from 1.43:1 to 2.86:1; and
a second film that is polyethylene terephthalate, wherein the first film is laminated to the second film by way of an adhesive layer selected from the group consisting of polyurethane adhesive and polyacrylate adhesive, the adhesive layer is in direct contact with the first film and the adhesive layer is in direct contact with the second film; and
the laminate has
a thickness from 70 μm to 100 μm,
a pre-lamination coefficient of friction less than 0.3, and
a Laminate Coefficient of Friction (COF) from 0.01 to 0.30.

2. The laminate of claim 1, further comprising a third film, wherein the third film is laminated to the second film.

3. The laminate of claim 1 wherein the laminate is void of silicone.

* * * * *